Oct. 11, 1966 S. GRONER ET AL 3,278,193
CLAMPING DEVICE
Filed May 25, 1964 4 Sheets-Sheet 2

INVENTORS.
STANLEY GRONER
ARNOLD STUART NEIDLE
BY
*Arthur J. Plantamura*
ATTORNEY.

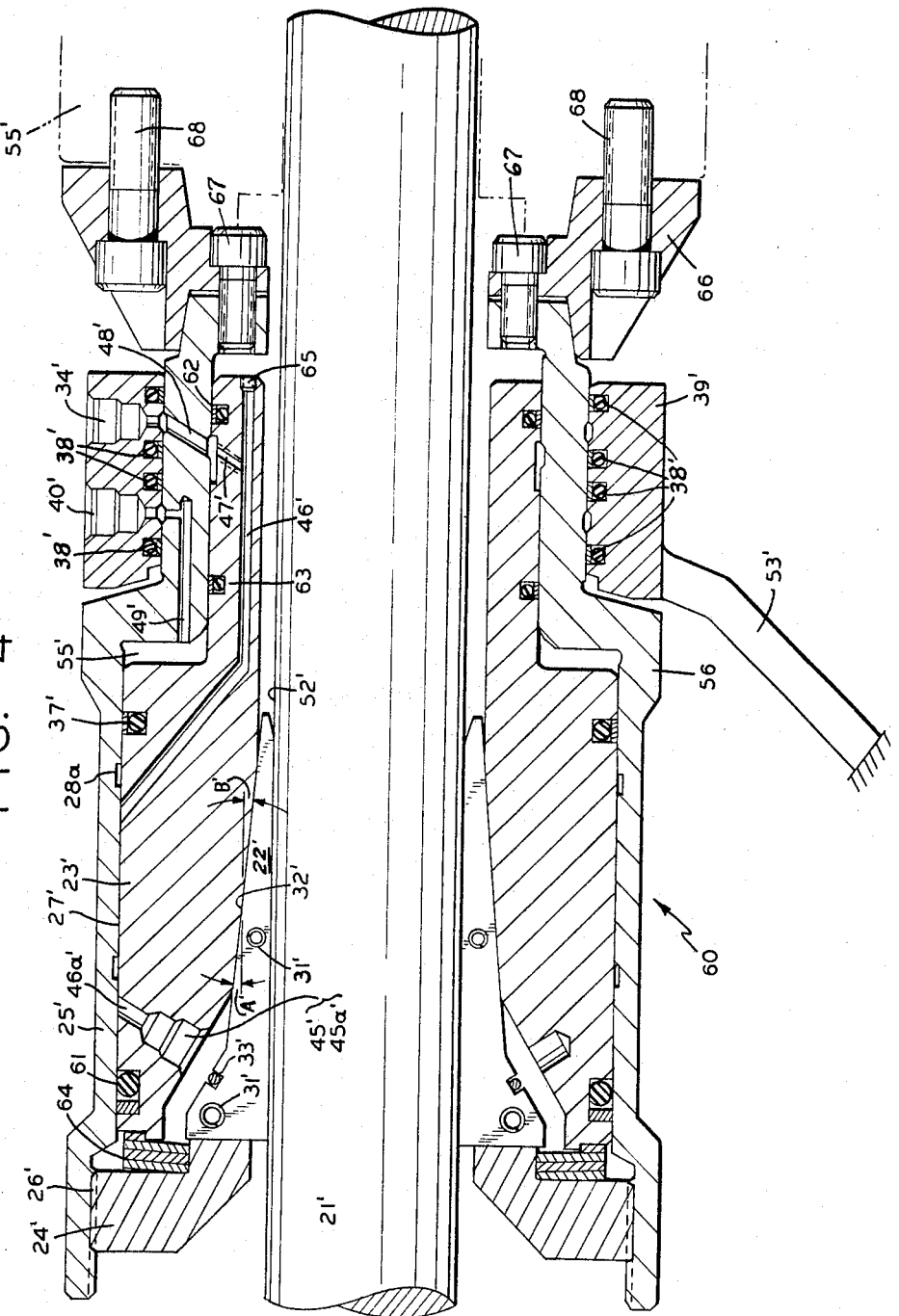

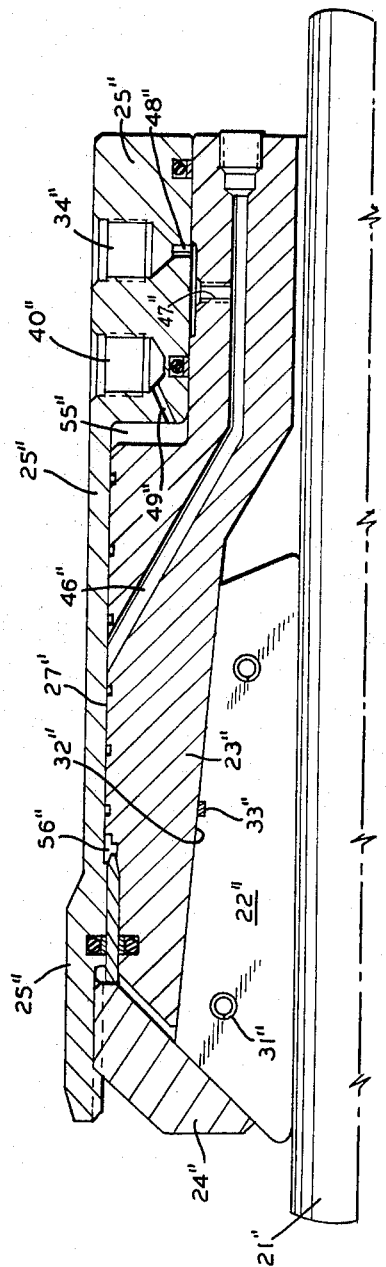

3,278,193
CLAMPING DEVICE
Stanley Groner, York, and Arnold Stuart Neidle, Harrisburg, Pa., assignors to American Machine & Foundry Company, a corporation of New Jersey
Filed May 25, 1964, Ser. No. 369,765
8 Claims. (Cl. 279—4)

The present invention relates to a locking device or system. Alternately, the mechanism of the invention more specifically is also referred to as a chuck, or clamping, or grasping device. In particular, the present invention relates to a novel clamping arrangement which is capable of effectively grasping a workpiece, that may have a wide range of tolerances and surface contour, and to hold it securely against high thrust and/or circumferential loads.

Many applications exist requiring a clamping or chucking operation, particularly in the machine tool art where, for example, it is desirable to pass a workpiece or other element to be held through a clamp, and upon command, to lock the piece rigidly against high thrust loads which oftentimes are in excess of 10,000 pounds.

In many cases, the tolerances of the diameter of the workpiece may be quite large and the surface finishes often vary considerably. Also there may be a requirement, in many applications, that the workpiece be rotated at high speed and be capable of resisting circumferential loads in addition to the thrust force. The present invention provides an arrangement that will satisfy all of these requirements by means of a low cost compact mechanism.

In essence, the invention is based on a mechanism for clamping the workpiece with a segmented collet which is forced onto the workpiece by actuating a hydraulic or other fluid piston. The collet is locked after positioning by an interference fit between the essentially concentrically disposed elements. When the operation on the workpiece has been completed, the lock is released by means of fluid pressure to uncouple the interference fit and the piston is withdrawn in a conventional manner.

It is a primary object of the invention to provide a clamping mechanism for rigidly grasping workpieces against high thrust loads and/or circumferential loads.

It is a further and more specific object of the invention to provide a grasping mechanism or chuck which makes use of the relatively large locking forces obtainable by using an interference fit coupling between members. Fluid pressure is introduced at the interference fit to uncouple and allow relative movement of the members.

It is another object of the invention to provide a novel method for rapidly and securely clamping a piece to be held by a comparatively simple mechanism.

Other objects, advantages and capabilities provided by the invention will become apparent as the invention is described by the following detailed description taken in conjunction with the accompanying drawings wherein:

FIG. 4 is a side elevational view in section similar to FIG. 1 illustrating an alternate embodiment.

FIG. 5 is a portion of a side elevational view in section illustrating still a further alternate embodiment of the invention comprising a static clamp and wherein pressurized fluid introductory ports are formed as a part of external components of the interference fit coupling.

The novel concept of the invention will be primarily described in connection with the use thereof in a chucking mechanism, but it will be apparent that the invention, with modifications obvious to one skilled in the art, may also be applied to various other applications where it is desirable to grip the workpiece and resist high axial or circumferential forces. Alternate applications for the gripping mechanism of the invention, for example, may include pipe clamps and blowout preventers used in the oil tool industry.

The invention essentially utilizes the mechanical advantage of an inclined plane to obtain high clamping forces, together with the large locking forces derivable by the interference fit of two elements which are capable of being expanded within their elastic limit to allow relative movement between the two members.

It will be apparent that the configuration of the grasping element may take a variety of geometries while still utilizing the basic teachings of the invention.

Figure 1:
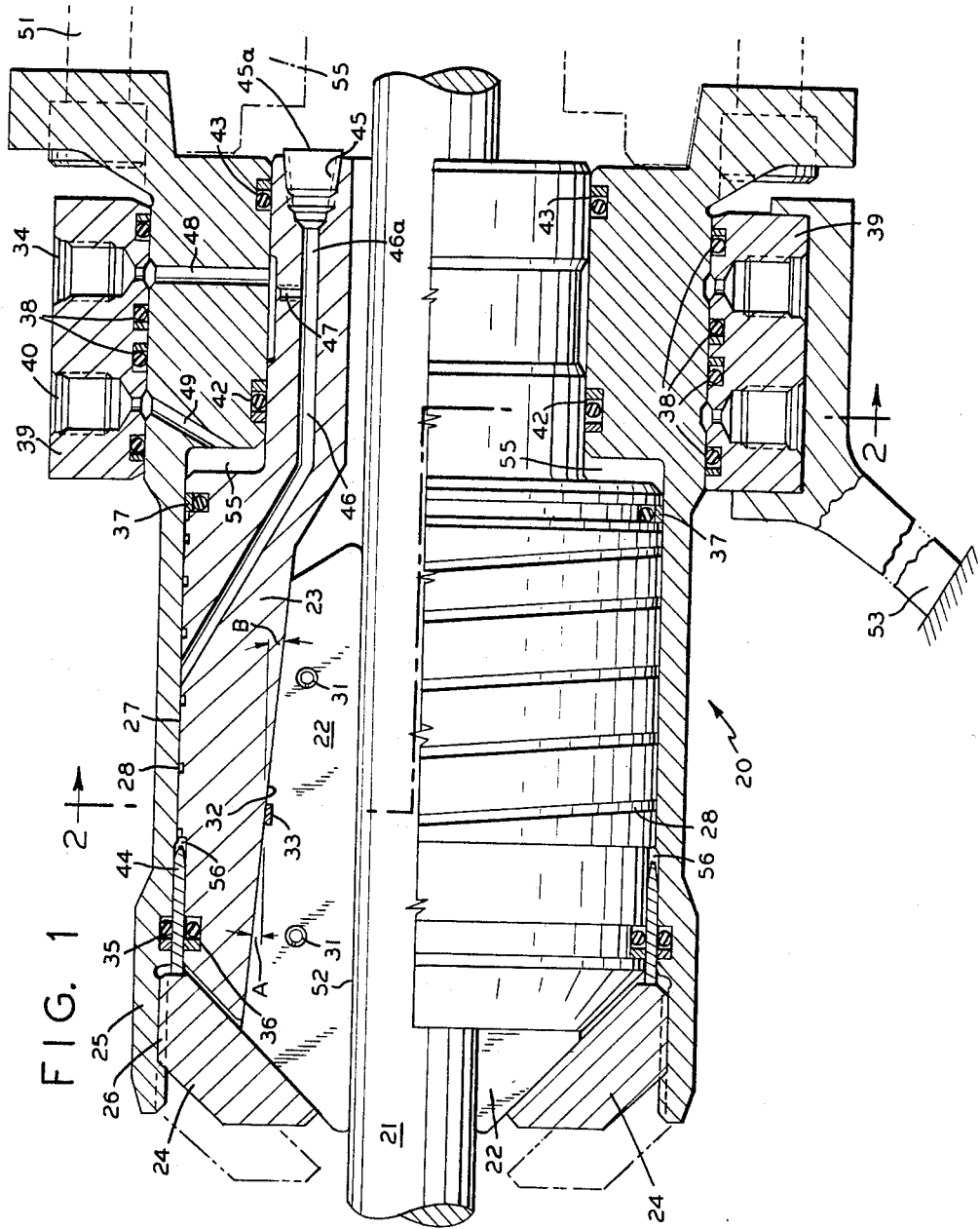
FIG. 1 is a side elevation sectional view illustrating the preferred embodiment of the clamping mechanism of the invention.
Figure 2:
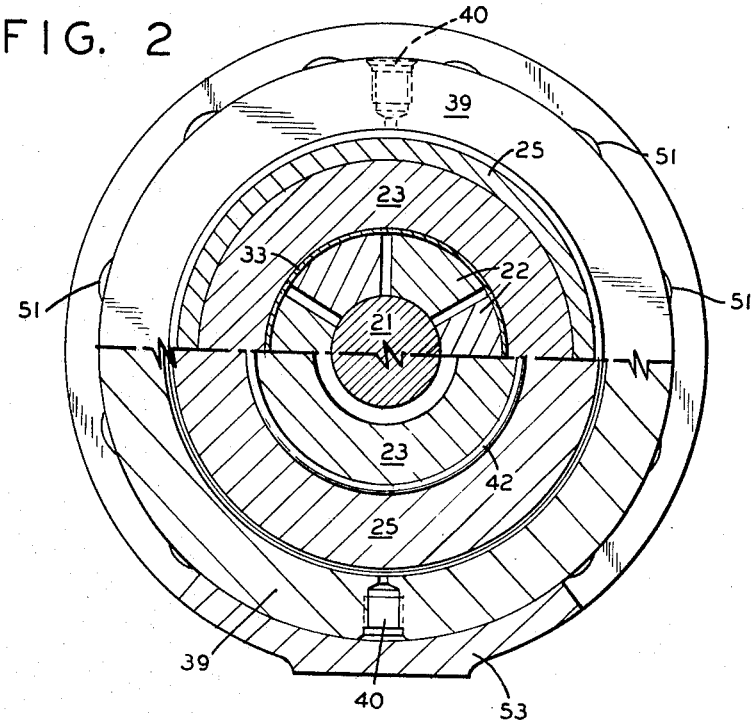
FIG. 2 is a transverse sectional view of the mechanism of FIG. 1 taken substantially along lines 2—2 of FIG. 1.
Figure 3:
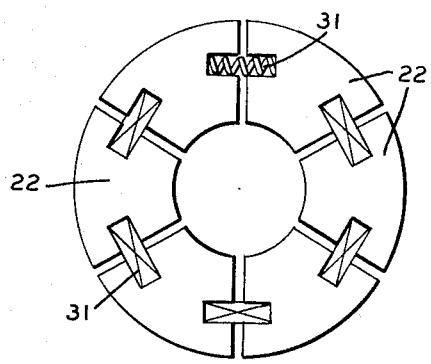
FIG. 3 is a transverse view showing the segmented collet.

Referring to FIG. 1, the clamp or chuck 20 is shown positioned over a member 21 (hereinafter also referred to as a workpiece) to be grasped. The purpose for gripping workpiece 21 may be to resist loads to the right and/or torsional loads in either direction. As the clamping element a collet 22 is employed which is segmented into six pieces and suitably held together in an expansible manner as by springs 31 shown in FIG. 3 and band 33 shown in FIG. 1. The force of springs 31 should be sufficient to produce a positive release of the workpiece 21 assuring substantial concentricity of the collet 22 when the applied force of piston 23 on the collet is relieved. It will be apparent that the essence of this invention does not depend particularly on a collet of discrete segments, nor on the number of segments of the collet, nor on the means by which the segments are held together. Any collet arrangement employed in the machine tool industry capable of providing a similar clamping force may be used. Element 23 comprises a combination piston and conical wedge configuration, contoured at its surface so that at least a portion of its inner periphery 32 has substantially the same angle A as the angle B of outer surface of the collet 22. These elements do not require any specific angle, although the optimum practical angle may depend, as will be discussed hereinafter, on various factors.

Substantially concentrically disposed over the workpiece 21 being held within the collet 22 and piston element 23, is a cylinder member 25. Member 25 in conjunction with member 23 provides the interference fit coupling feature of the invention. To prevent axial motion of the collet 22 to the left, a nut 24 threaded at 26 to cylinder 25 is employed, although various other means of preventing this axial motion or to provide a comparable stop would be satisfactory. Cylinder 25 is constructed to have an interference fit at 27 with piston element 23, i.e. the inner periphery of member 25 before assembly is machined or otherwise formed to have a smaller diameter than the outer periphery of element 23. After assembly there results an interference fit which securely couples the respective members at the engaging interface 27 between the outer periphery of element 23 and inner periphery of element 25. This interference can be uncoupled or disengaged by applying fluid pressure to port 34. As an aid to accelerate more rapid distribution of fluid introduced at 34 for the interface 27, it may be desirable to provide annular grooves 28 which may take any suitable form, e.g. spiral, circular, grid configuration, etc. Additionally, while these fluid distributing grooves 28 are shown formed in the piston element, it will be apparent that grooving of various configurations in lieu thereof, or in addition thereto, may be formed in the cylinder wall, e.g. as rifling. The interference fit, the method of assembly and disassembly, the coupling and uncoupling at the interference fit interface, and other details of construction, as well as other details of operation of interference fit bearing-locks, is more fully described in the pending U.S. patent application S.N. 280,355, now Patent 3,150,571, granted September 29, 1964.

In FIG. 1, elements 35, 36, 37, 38, 42 and 43 are circular seals used to confine fluid pressure. Any of various known seal configurations suitable for this purpose may be used. The function of these seals is considered more specifically hereafter.

Element 44 is a sealing collar or ring whose function is to facilitate assembly and preferably is formed of metal. During the release motion element 44 also provides an area against which fluid pressure develops thereby moving piston member 23 to the right to release the collet 22. It will be apparent that seal ring 44 may be omitted by properly contouring piston 23 and cylinder 25 in lieu of collar 44. A passage 46, suitably formed in piston 23, is employed to carry fluid pressure to interface 27 to uncouple the interference fit. In the normal gripping operation of the chuck fluid pressure is introduced through port 34. In assembling the piston member 23 within cylinder 25, fluid pressure is introduced instead at port 45 through passage 46a and 46 while at the same time blocking passage 47. After the piston 23 has been assembled within cylinder 25, port 45 is thereafter suitably sealed as by plug 45a and thereafter the blockage or plug in 47 inserted therein to effect assembly is removed through passage 48 before assembling seal gland 39. It will be apparent, however, that suitable alternate means may be used to assemble the piston 23 within the cylinder 25, such as by heating cylinder 25 to expand it while cooling piston 23 to effect shrinkage.

Seal gland 39 contains seals 38 (four of which are shown) and ports 34 and 40 which are used to transfer fluid pressure through passages 48 and 49 internally to cylinder 25. A plurality of ports 34 and 40 may be located annularly around the gland 39 although even one of each may suffice. Suitable securing means such as bolts 51 may be used to conveniently attach the cylinder 25 to a spindle 55 or to other suitable mounting surface.

Operation of the chuck is as follows: a collet 22 is selected which is sized so as to allow a small radial clearance between the collet and the workpiece 21 at surface 52. The collet 22 is inserted internally into piston-wedge element 23 and secured with the nut 24. Nut 24 provides a desirable and practical adjustment mechanism. Movement of the nut 24 adjusts tolerances to minimize the clamping movement required by the piston in grasping the workpiece. The apparatus is now assembled so that the workpiece 21 may now be inserted into collet 22. It is apparent, however, that the order of assembly for some operations may be varied, e.g. the nut 24 may be secured after insertion of the workpiece. Suitable fluid pressure, preferably hydraulic pressure, is applied at ports 34 and 40 after the assembly. At this stage, pressure from port 40 flowing through passage 49 pressurizes chamber 55 thereby tending to push piston-wedge 23 to the left. The fluid pressure is confined by seals 37 and 42. To allow the desired movement pressure at port 34 flowing through passages 48, 47 and 46 and confined by seals 35, 36 and 37 releases the interference fit at surface 27. The same fluid pressure introduced at port 34 pressurizes chamber or space 56 thereby pushing piston-wedge 23 to the right. Seals 35 and 36 retain the pressure acting in chamber 56. Inasmuch as the area upon which pressure acts located between seals 37 and 42 is greater than the area between seals 35 and 36, the net force will favor that on piston-wedge 23 in chamber 55 thereby effecting movement to the left. This net force will move the piston-wedge 23 so that, due to the geometry of the sloping surface 32, the collet 22 will tighten its grip on the workpiece 21 as the collet is compressed radially inward. The amount of radial force exerted on the collet depends on the coefficient of friction at surface 32, the angle of surface 32 and the net differential force (producing horizontal motion) which has been discussed above and which acts on piston-wedge 23. The amount of axial and torsional load that can be applied to the workpiece 21 without slipping depends on compressive force exerted by collet 22 on the workpiece and the coefficient of friction at surface 52. In summary, the overall axial and torsional forces that can be applied to workpiece 21 before it slips in the collet depends on the coefficients of friction at interfaces at 52 and 32, the angle of surface 32 and the net horizontal force acting on piston-wedge 23. Once these forces have been applied, retention thereof is effected by coupling the interference fit at interface 27.

While the chuck of the invention has the capability of gripping with relatively high force, the force imparted to the workpiece may be controlled within limits by suitable means. Accordingly, when a limit to the force to be applied is important as, for example, when heavy forces may result in crushing the workpiece, the clamping force may be restricted by properly positioning the nut 24. By a suitable adjustment of this nut, movement of the piston 23 (to the left as shown in the drawing) is limited to a force tolerable by the workpiece. Alternately, the force applied to the workpiece may be contained within desirable limits by use of a fluid pressure regulator to control the magnitude of fluid pressure introduced into port 40.

When pressure at port 34 is relieved, the piston-wedge 23 will again be coupled in an interference fit with cylinder 25 and thus locked thereto. This coupling, at the interface 27, provides a rigid load path from workpiece to collet to piston-wedge to cylinder to bolts 51 which secures the cylinder to its mounting 55. To prevent loss of any substantial gripping force by the collet, pressure is first relieved in sequence at 34 before it is relieved at 40 which feeds chamber 55.

The workpiece is released by applying pressure to port 34. This releases the interference fit at surface 27. This same pressurization pushes on piston-wedge 23 between seals 35 and 36 as discussed hereinabove. Under this condition, where pressurization in chamber 55 through port 40 is omitted, the piston-wedge 23 will stroke to the right due to the force of pressure build-up in chamber 56. As a consequence the clamping force exerted on the collet by the piston is released and the collet will return radially to its normal expanded position through the action of springs 31 whereby it releases its grip on the workpiece.

Any suitable means may be used to position and maintain the chuck 20 in its functioning environment. As shown, the gland 39 is fastened at 53 to a fixed mounting. A mounting of this kind allows the rest of the unit to rotate if a rotating application is desired, such as might occur if bolts 51 were attached to a spindle 55.

In FIG. 4, an alternate construction embodying the concept of the invention is illustrated. In facilitating a description of the alternate chuck arrangement, of FIG. 4, substantially similar parts, which function in essence similarly to these referred to in FIG. 1, are designated with corresponding reference numerals, but distinguished therefrom by prime (') symbols after the reference numeral. Referring to FIG. 4, the clamp or chuck 60 is shown positioned over the member 21' to be grasped. As was the case with FIG. 1, the purpose for gripping workpiece 21' may be to resist loads to the right and/or torsional loads in either direction. A suitable clamping means or collet 22' affords radially expanding and contracting gripping and release means. When a discretely segmented collet 22' is used, any suitable means for holding the collet segments in proper relationship such as connecting element 31' and retainer 33' may be used. As with element 23 of FIG. 1, piston 23' comprises a combination piston and conical wedge configuration, contoured at its surface so that at least a portion of its inner frusto-conical periphery has substantially the same angle A′ as the mating angle B′ of frusto conical outer surface of the collet 22′.

Concentrically disposed over the workpiece 21′, the collet 22′ and piston element 23′, respectively, is a cylinder member 25′. To prevent axial motion of the collet 22′ to the left, suitable means such as nut 24′ threaded at 26′ to cylinder 25′ is employed. Cylinder 25′ is constructed to have an interference fit at 27′ with piston element 23′, i.e. the inner periphery of member 25′ has a smaller diameter than the outer periphery of element 23′ before assembly. To aid in a more uniformly rapid distribution of fluid pressure at the interface 27′, grooves 28(a) formed in the cylinder element 25′ may be employed. After assembly there is an interference fit at the engaging interface 27′ which locks together members 23′ and 25′. This interference fit is uncoupled and disengaged by applying fluid pressure to port 34′.

To confine fluid pressure, seals 37′, 38′, 61, 62 and 63 are used. The function of these seals is considered more specifically hereafter. Any suitable seal configuration may be used. A passage 46′, suitably formed in piston 23′ is employed to carry fluid pressure to uncouple the interference fit at 27′. In normal operation fluid pressure is introduced through port 34′. In assembling the piston member 23′ within cylinder 25′ fluid pressure is introduced at port 45′ through passage 46a′ while plugging passage 47′. After piston 23′ is assembled within cylinder 25′, port 45′ is suitably sealed as by plug 45a′ and thereafter the plug in 47′ is removed through passage 48′. Plug 65 functions to seal the passage 46′ after it has been formed in member 23′, in a manner similar to that described in connection with FIG. 1. Also as noted, alternate means may be used to assemble piston element 22′ within cylinder element 25′ such as by expanding cylinder 25′ with heat while shrinking piston 23′ by cooling.

A gland 39′ contains seals 38′ four of which are shown and ports 34′ and 40′ which are used to transfer fluid pressure 48′ and 49′, respectively, of cylinder 25′.

To secure the chuck in operable position, the adapter 66 secured by bolts 67 secured to cylinder 25′ and bolts 68 secured to a spindle 55′ or to any other mounting surface, may be employed.

In the embodiment of FIG. 4, a spring 64 is used in lieu of seal ring 44 and seals 35 and 36 of FIG. 1. Essential spring 64 provides the actuating force to move piston 23′ to the right and thereby releases the collet after the interference fit at 27′ has been uncoupled.

The operation of the chuck of FIG. 4 is as follows: after a suitably sized collet is selected, it is inserted into piston member 23′ and secured with nut 24′. The nut 24′ may be adjusted to minimize the clamping movement required by the piston. The workpiece 21′ is now inserted into collet 22′. Suitable fluid pressure, preferably hydraulic pressure, is applied at ports 34′ and 40′. At this stage, pressure from port 40′ flowing through passage 49′ pressurizes chamber 55′ thereby tending to push piston member 23′ to the left. The fluid pressure is confined by seals 37′ and 63. To effect the desired movement, the interference fit at 27′ must be uncoupled by introducing pressure at port 34′. Fluid introduced at 34′ flows through passages 48′, 47′ and 46′, is confined by seals 61 and 37′, and releases the interference fit at surface 27′.

The force of the fluid pressure at 40′ acting in chamber 55′ is greater than the opposing force of spring 64. The net force on piston-wedge 23′ will effect movement to the left. This net force will move the piston-wedge 23′ so that, due to the geometry of the sloping surface 32′, the collet 22′ will tighten its grip on the workpiece 21′ as the collet is compressed radially inward. The amount of radial force exerted on the collet as described with reference to FIG. 1, depends on the coefficient of friction, angle of sloping surface and the net differential force producing horizontal motion. The amount of axial torsional load that can be applied to the workpiece without slipping depends on compressive force exerted by the collet on the workpiece and the coefficient of friction at surface of the workpiece.

As pressure at port 34′ is relieved, the cylinder 25′ and piston 23′ will again be securely locked in an interference fit. This coupling between members 23′ and 25′ provides a rigid load path from workpiece to collet to piston wedge to cylinder to bolts, which secures the cylinder to its mounting 55′. To prevent loss of any substantial gripping by the collet when the workpiece is grasped, pressure is first relieved in sequence at 34′ and then relieved at 40′. When the workpiece is to be released, pressure is applied to port 34′. This releases the interference fit at interface 27′. At this stage the force of spring 64, under compression, pushes piston 23′ to the right and in turn removes the clamping force exerted on the collet by the piston. The collet will return radially to its normal expanded position upon release of its grip on the workpiece.

Any suitable means may be used to mount the chuck 60 in its functioning environment. As shown, the seal gland 39′ is fastened at 53′ to a fixed mounting, as described in conjunction with FIG. 1.

The arrangement of FIG. 5 illustrates an arrangement of comparable configuration in which reference numerals followed by double prime (″) symbols are used to show those parts which function similarly as those bearing like (unprimed) numerals in FIG. 1. Essentially the arrangement of FIG. 5 differs from that of FIG. 1 in that the former contemplates a chucking device for static applications as distinguished from that of FIG. 1 in which chuck 20 has the capability of rotating. Also, ports 34″, 40″, and 47″ in the embodiment of FIG. 5 are formed in the cylinder member 25″ as distinguished from their counterparts of FIG. 1 which are formed in the gland 39. In assembly and operation, the chuck shown in FIGURE 5 is generally the same as that shown in FIGURES 1–4. After the workpiece 21″ is in position, the interference fit interface 27″ is uncoupled by introducing fluid pressure at 34″. Gripping of the workpiece 21″ is effected as piston element 23″ moves to the left relative to collet 22″ by pressurizing chamber 55″ through port 40″. Collet 22″ in turn applies force on workpiece 21″. Gripping force is maintained by releasing pressure at 34″ and then 40″ in sequence. To release the workpiece, pressure is introduced at 34″ to the exclusion of pressure at 40″. This uncouples the interface at 27″ followed by pressure build-up at 56″ which moves piston element to the left relative to collet 22″.

It will be apparent to those skilled in the art that various modifications may be made in the invention without departing from the scope of the invention. Accordingly, the invention is not to be limited except insofar as necessitated by the appended claims.

We claim:

1. A clamping mechanism comprising a collet member to receive therein a member to be clamped, said collet member defining a substantially conical outer peripheral surface; a piston member having at least in part a substantially cylindrical outer peripheral surface and at least in part a substantially conical inner peripheral surface of a contour which substantially coincides with the conical outer peripheral surface of said collet member as said collet member is inserted in said piston member, and an outer cylindrical member adapted to receive therein said piston member and to engage at its inner periphery in interference fit at least part of the cylindrical outer surface of the piston member; means to engage the respective conical surfaces to produce variation in the cross section within the collet member as said piston member is moved relative to said collet member, and means to introduce fluid to the interface of the interference fit to uncouple said outer cylindrical member from said piston member.

2. A clamping mechanism comprising a collet member to receive therein a member to be clamped, said collet member defining a substantially conical outer peripheral surface; a piston member adapted to be actuated relative to said collet member by fluid pressure and having at least in part a substantially cylindrical outer peripheral surface and at least in part a substantially conical inner peripheral surface of a contour which substantially coincides with the conical outer peripheral surface of said collet member; and an outer cylindrical member adapted to receive therein said piston member and to engage at its inner periphery in interference fit at least part of the cylindrical outer surface of the piston member; fluid means to produce relative movement between the respective conical surfaces and thereby vary the cross sectional space within the collet member, and means to introduce fluid at the interface of the interference fit to uncouple said outer cylindrical member from said piston member.

3. The mechanism of claim 1 wherein the movement of said piston member relative to said collet member is effected by fluid pressurization against said piston member.

4. The mechanism of claim 1 further provided with an adjustment nut adjacent to said collet and wherein said nut varies the tolerance between said collet and said piston after a workpiece is introduced into said collet.

5. The mechanism of claim 1 further provided with means for controlling the clamping pressure exerted by said collet member.

6. The mechanism of claim 2 wherein the said collet member is provided with a second conical outer peripheral surface and the outer cylindrical member is provided with a stop having a coinciding inner conical peripheral surface against which said second conical surface abuts with increasing force as said collet member and piston member conical surfaces engage with increasing force.

7. The mechanism of claim 1 wherein relative movement between the piston member and the outer cylindrical member to expand the collet is aided by spring means as the interface of the interference fit between the piston member and the cylindrical member is uncoupled by fluid pressurization.

8. The mechanism of claim 1 wherein the interface is formed in conjunction with a seal ring and chamber into which fluid pressure introduced at the interference interface is directed and in which pressure build-up to effect release of the coinciding conical surfaces occurs.

References Cited by the Examiner
UNITED STATES PATENTS

| | | | |
|---|---|---|---|
| 961,375 | 6/1910 | Seabrook | 29—427 |
| 2,864,623 | 12/1958 | Spink | 279—4 |
| 2,911,222 | 11/1959 | Eve | 279—4 |
| 3,125,802 | 3/1964 | Kenin | 29—427 |

References Cited by the Applicant

| | | |
|---|---|---|
| 2,564,670 | 8/1951 | Bratt. |
| 2,764,437 | 9/1956 | Bratt. |
| 2,980,474 | 4/1961 | Gargan. |
| 3,058,559 | 10/1962 | Ohrnberger. |

ROBERT C. RIORDON, *Primary Examiner.*

LESTER M. SWINGLE, *Examiner.*

H. V. STAHLHUTH, *Assistant Examiner.*